United States Patent
Maeda et al.

(10) Patent No.: US 10,612,484 B2
(45) Date of Patent: Apr. 7, 2020

(54) CONTROL APPARATUS FOR ENGINE

(71) Applicant: MITSUBISHI JIDOSHA KOGYO KABUSHIKI KAISHA, Tokyo (JP)

(72) Inventors: Satoshi Maeda, Tokyo (JP); Junya Kitada, Tokyo (JP); Hideo Matsunaga, Tokyo (JP); Katsuhiro Furuta, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 15/924,765

(22) Filed: Mar. 19, 2018

(65) Prior Publication Data
US 2018/0274470 A1   Sep. 27, 2018

(30) Foreign Application Priority Data
Mar. 27, 2017   (JP) .................. 2017-061298

(51) Int. Cl.
*F02D 41/14*   (2006.01)
*F02D 41/22*   (2006.01)
*F02D 41/24*   (2006.01)

(52) U.S. Cl.
CPC ..... *F02D 41/1495* (2013.01); *F02D 41/1456* (2013.01); *F02D 41/1475* (2013.01);
(Continued)

(58) Field of Classification Search
CPC ............. F02D 41/1495; F02D 41/1456; F02D 41/1475; F02D 41/22; F02D 41/2454;
(Continued)

(56) References Cited

U.S. PATENT DOCUMENTS 6,012,438 A * 1/2000 Joos ..................... F02D 41/1454
123/198 D
6,138,638 A * 10/2000 Morikawa ............. F02D 41/061
123/295
(Continued)

FOREIGN PATENT DOCUMENTS

JP   2011-26961 A   2/2011

*Primary Examiner* — Mahmoud Gimie
*Assistant Examiner* — Susan E Scharpf
(74) *Attorney, Agent, or Firm* — Birch, Stewart, Kolasch & Birch, LLP

(57) ABSTRACT

Control apparatus for an engine includes a failure determination unit which determines whether there is a failure in an operating engine, and an A/F (air-fuel ratio) feedback control unit which performs feedback control to bring actual A/F in the engine to a target set in advance. The failure determination unit includes a failure determination section, a failure code storing section, a similar operating condition recording section, and a return-to-normal control section. The A/F feedback control unit includes an A/F target setting section, and the target set is stored in the similar operating condition recording section as a factor defining the operating condition of the engine. The return-to-normal control section eliminates the failure code if the failure determination section does not determine that there is a failure when the engine is operating in an operating condition similar to that recorded in the similar operating condition recording section.

6 Claims, 3 Drawing Sheets

(52) U.S. Cl.
CPC ......... *F02D 41/22* (2013.01); *F02D 41/2454* (2013.01); *F02D 2041/224* (2013.01); *F02D 2200/101* (2013.01); *F02D 2200/1015* (2013.01); *Y02T 10/40* (2013.01)

(58) Field of Classification Search
CPC ......... F02D 2041/224; F02D 2200/101; F02D 2200/1015; Y02T 10/40
USPC ........................................................ 701/103
See application file for complete search history.

(56) References Cited

U.S. PATENT DOCUMENTS

| | | | | |
|---|---|---|---|---|
| 6,283,108 | B1* | 9/2001 | Matsufuji | F02D 41/221 123/458 |
| 6,915,203 | B2* | 7/2005 | Maegawa | F01N 3/101 701/114 |
| 7,025,050 | B2* | 4/2006 | Oono | F02D 41/222 123/447 |
| 8,281,768 | B2* | 10/2012 | Cinpinski | F02D 41/2438 123/458 |
| 8,443,655 | B2* | 5/2013 | Matsuura | F02D 41/182 73/114.32 |
| 8,539,934 | B2* | 9/2013 | Kaneko | F02D 41/22 123/447 |
| 8,573,185 | B2* | 11/2013 | Miura | F02D 41/22 123/198 D |
| 8,789,409 | B2* | 7/2014 | Matsuura | F02D 41/182 73/114.32 |
| 9,394,845 | B2* | 7/2016 | Stack | F02D 41/222 |
| 9,494,102 | B2* | 11/2016 | Strasser | F02D 41/3809 |
| 2008/0097683 | A1* | 4/2008 | Yasui | F02D 13/0207 701/104 |

* cited by examiner

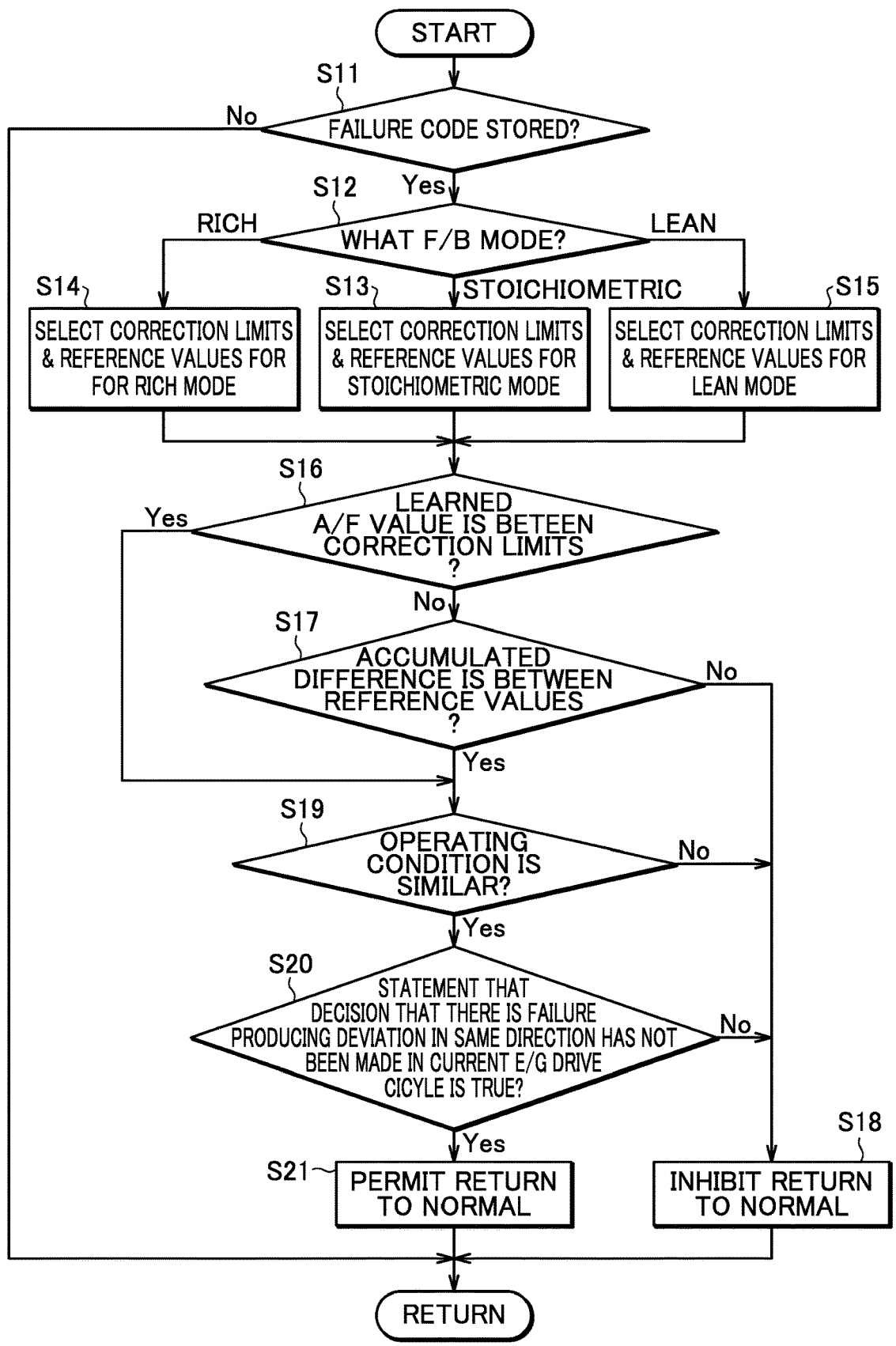

CONTROL APPARATUS FOR ENGINE

BACKGROUND OF THE INVENTION

Field of the Invention

The present invention relates to control apparatus for an engine, specifically control apparatus applied to an engine configured such that A/F (air-fuel ratio) control can be performed switching between a stoichiometric feedback mode with a target set at a stoichiometric A/F and a non-stoichiometric feedback mode with a target set at a non-stoichiometric A/F.

Description of the Related Art

The engine includes a variety of systems including a fuel system, an ignition system and an exhaust emission control system. If the engine does not operate normally because of a failure in any of these systems, it directly leads to an adverse effect, such as deteriorated exhaust-gas characteristics. Thus, according to legal regulations or based on an automotive manufacturer's independent judgment or the like, a function of detecting a failure in each system is added to the engine. When a failure is detected, the failure is indicated to urge a driver to make repair and a failure code corresponding to the type of the failure is stored in an engine-controlling ECU to be of use in future repair.

There is a possibility that a trifle causes the ECU to erroneously determine that there is a failure. For example, when the ECU determines whether there is a failure in the fuel system based on a deviation from the target A/F, if a cause other than a fuel-system failure accidentally produces a variation in A/F which meets a condition for determining that there is a failure, the ECU may determine that there is a failure. When such wrong decision is made, a wrong failure code is held in the ECU, and if a switch from a normal control process to an alternative control process is made to counteract a possible system failure, the alternative control process, which is not necessarily optimal, continues to be performed needlessly.

Thus, it is proposed that, if the system which was determined to be malfunctioning is afterwards not determined to be malfunctioning during operation of the engine, a return to normal be made by eliminating the failure code and, if a switch to the alternative control process was made, switching back to the normal control process (See Patent Document 1: Japanese Unexamined Patent Application Publication No. 2011-26961, for example).

To reverse the former decision that there is a failure, it is necessary to determine whether there is a failure, in an engine operating condition similar to that at the time the former decision was made. Thus, in the technology disclosed in the above Patent Document 1, an engine rpm, an engine load, an engine warming state and an injection mode (port injection or in-cylinder injection) are recorded as factors defining the engine operating condition, and after it was determined that there was a failure, a return to normal, including elimination of the failure code, is made on the condition that it is not determined that there is a failure in an engine operating condition which is similar with respect to all the factors.

Due to recent improvement in detection accuracy of an LAFS (linear air-fuel ratio sensor) for detecting an exhaust A/F in the engine, etc., the target in A/F feedback based on values detected by the LAFS is allowed to be set not only at a stoichiometric (theoretical) A/F but also at a rich or lean A/F. In this case, A/F is controlled switching between a stoichiometric feedback mode (with the target set at a stoichiometric A/F), a rich feedback mode (with the target set at a rich A/F) and a lean feedback mode (with the target set at a lean A/F) depending on, for example engine operating region. It is therefore required that a failure be correctly detected in any of these A/F feedback modes.

However, even in the similar engine operating condition (similar engine rpm, engine load and engine warming state), a controlled variable in each system of the engine differs depending on the A/F feedback mode. Specifically, the controlled variable which should be taken to indicate a failure in some A/F feedback mode may be the controlled variable which should not be taken to indicate a failure in another A/F feedback mode. Thus, even if in some A/F feedback mode it is correctly determined that there is a failure based on the controlled variable and a failure code is stored, if a switch to another A/F feedback mode is made and it is determined that there is no failure, the return to normal is made and the failure code, which should be held, is eliminated inappropriately.

SUMMARY OF THE INVENTION

An object of the present invention is to provide control apparatus applicable to an engine configured such that A/F control can be performed switching between a plurality of A/F feedback modes, and capable of correctly detecting a failure in the engine in any of the A/F feedback modes.

In order to achieve the above object, control apparatus for an engine according to the present invention comprises a failure determination unit which determines whether there is a failure in the engine during operation of the engine, and an A/F (air-fuel ratio) feedback control unit which performs feedback control on the engine to bring actual A/F in the engine to a target set in advance, wherein the failure determination unit includes a failure determination section which determines that there is a failure in the engine when a predetermined condition is met, a failure code storing section in which a corresponding failure code is stored when the failure determination section determines that there is a failure, a similar operating condition recording section in which an operating condition of the engine at the time that the failure determination section determined that there was a failure is recorded, and a return-to-normal control section which eliminates the failure code stored in the failure code storing section, wherein the A/F feedback control unit includes an A/F target setting section which sets a target for A/F in the engine, the target set by the A/F target setting section is stored in the similar operating condition recording section as a factor defining an operating condition of the engine, and the return-to-normal control section eliminates the failure code if, after the failure code was stored in the failure code storing section, the failure determination section does not determine that there is a failure when the engine is operating in an operating condition similar to that recorded in the similar operating condition recording section.

In the control apparatus for the engine configured as described above, when the failure determination section determines that there is a failure in the engine, a corresponding failure code is stored in the failure code storing section and a target A/F set by the A/F target setting section is recorded in the similar operating condition recording section as a factor defining an engine operating condition. After that, if the failure determination section does not determine that there is a failure when the engine is operating in an operating condition similar to that recorded in the similar operating condition recording section, the return-to-normal control section eliminates the failure code.

Since the target A/F is recorded as a factor defining the engine operating condition, even if the failure determination section does not determine that there is a failure, the failure code is not eliminated when the current target A/F is not similar to that recorded. This prevents the failure code from being inadvertently eliminated neglecting a difference in target A/F.

The present invention can thus provide control apparatus applicable to an engine configured such that A/F control can be performed switching between a plurality of A/F feedback modes, and capable of correctly detecting a failure in the engine in any of the A/F feedback modes.

BRIEF DESCRIPTION OF THE DRAWINGS

FIG. 3 is a flowchart showing a return-to-normal determination routine executed by the ECU 11 shown in FIG. 1.

DETAILED DESCRIPTION OF THE PREFERRED EMBODIMENTS

An embodiment of fuel system control apparatus for an engine according to the present invention will be described below.

Figure 1:
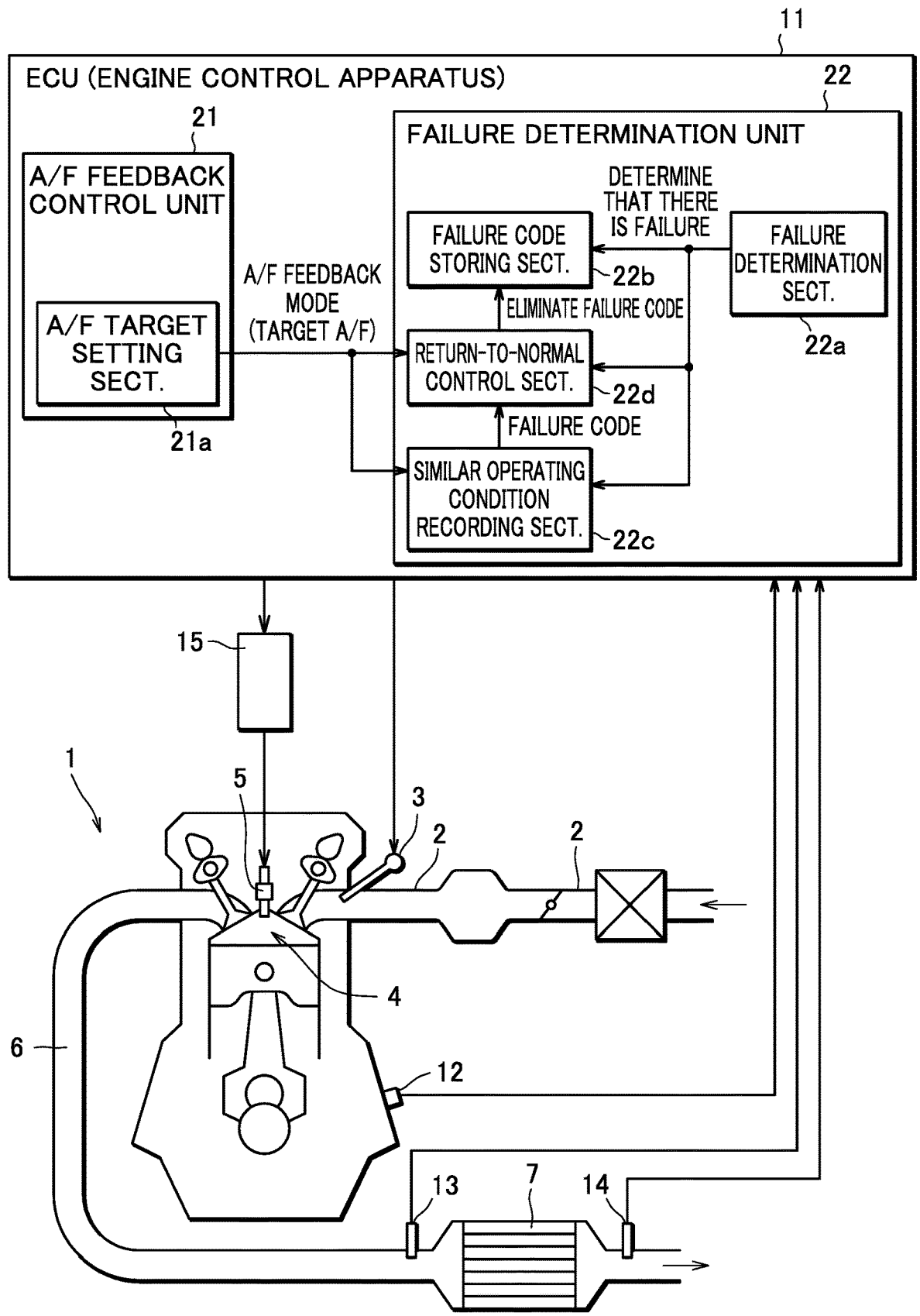
FIG. 1 is a diagram showing the overall configuration of an engine to which a fuel system control apparatus according to an embodiment of the present invention is applied.

FIG. 1 is a diagram showing the overall configuration of an engine to which a fuel system control apparatus in the present embodiment is applied.

An injector 3 is arranged in an intake passage 2 of an engine 1. Fuel injected from the injector 3 is drawn into a combustion chamber 4 with intake air, and burnt by being ignited by an ignition plug 5. Exhaust gas resulting from combustion is discharged into an exhaust passage 6, converted into less harmful gas by a three-way catalytic converter 7 arranged in the exhaust passage 6 and discharged into the atmosphere.

In the interior of a vehicle, an ECU 11 (engine 1 controller) comprising an input/output device, memory devices (ROM, RAM, non-volatile RAM, etc.) for storing control programs, control maps, etc., a central processing unit (CPU) and a timer counter, which are not shown, is installed to perform integrated control over the engine 1. In the memory of the ECU 11, for example non-volatile RAM, commands for performing later-described operations are stored. To the input of the ECU 11, a variety of sensors including a crank angle sensor 12, an LAFS (linear air-fuel ratio sensor) 13 arranged upstream of the three-way catalytic converter 7 to detect exhaust A/F, and an $O_2$ sensor (oxygen sensor) 14 arranged downstream of the three-way catalytic converter 7 to detect oxygen concentration of exhaust gas are connected. To the output of the ECU 11, a variety of devices including the injector 3 and an igniter 15 to drive the ignition plug 5 are connected.

The ECU 11 (engine 1 controller) makes the engine 1 operate based on values detected by the sensors. For example, the ECU determines ignition timing, fuel injection quantity and so on from predetermined control maps depending on engine operating region, and operates the igniter 15 and the injector 3 based on set targets.

In the present embodiment, the ECU 11 includes an A/F feedback control unit 21 which performs A/F feedback control to bring actual A/F of exhaust gas resulting from combustion in cylinders to a target set in advance by regulating fuel injection quantity. The A/F control unit 21 includes an A/F target setting section 21a to set a target for A/F. The A/F feedback control unit 21 performs A/F feedback not only in a stoichiometric feedback mode but also in a rich feedback mode and a lean feedback mode. Thus, in A/F feedback, the A/F target setting section 21a sets the target not only at a stoichiometric, or theoretical A/F but also at a rich A/F, which corresponds to exhaust gas containing a large proportion of fuel as compared with stoichiometric exhaust gas, and a lean A/F, which corresponds to exhaust gas containing a large proportion of air as compared with stoichiometric exhaust gas.

Basically, the stoichiometric feedback mode with the target set at the stoichiometric A/F is selected. In a high load region requiring high power performance, for example, the rich feedback mode with the target set at a rich A/F is selected. Also in fuel injection following a fuel cut-off, or stopping of fuel supply, the rich feedback mode with the target set at a rich A/F is selected to prevent a decrease in NOx conversion efficiency, which is caused by too much $O_2$ being stored in the catalyst in the three-way catalytic converter 7 during the fuel cut-off, thereby lowering NOx reduction performance.

The A/F feedback control performed by the A/F feedback control unit 21 will be described in detail.

The A/F target setting section 21a selects an A/F feedback mode based on an operating condition of the engine 1, and A/F feedback is performed in the selected mode to bring A/F upstream of the three-way catalytic converter 7 to a target set by the A/F target setting section 21a, based on output of the LAFS 13 which can be regarded as an actual A/F. Specifically, in each cycle of feedback control, correction quantity is updated based on a deviation of an actual A/F, detected by the LAFS, from the target, and fuel injection quantity, or amount of fuel injected from the injector 3 is corrected with the correction quantity. The base value for correction quantity is 0. When the actual A/F is richer than the target, the correction quantity is updated in the negative direction, and when the actual A/F is leaner than the target, the correction quantity is updated in the positive direction. If actual A/Fs detected in cycles of feedback control contain a stationary deviation from the target, an A/F learning process is performed to update learned A/F value applied to the LAFS 13, based on an integration term of LAFS correction quantity. The fuel injection quantity is corrected based on the output of the LAFS 13 corrected with the learned A/F value such that the mid-value of output of the LAFS 13, which should indicate the stoichiometric A/F, corresponds to the mid-value of the target.

During A/F feedback by the A/F feedback control unit 21 in the ECU 11, if the integration term (accumulated correction quantity) and the A/F learned value deviate from their respective predetermined normal ranges in the same direction (to the "rich" or "lean" side), the failure determination unit 22 determines that there is a failure in the fuel injection control system. Specifically, the failure determination unit 22 determines whether or not there is a "lean" failure, which means that the correction to the fuel injection quantity based on the accumulated correction quantity and the learned A/F value results in a too rich A/F, or a "rich" failure, which means that the correction to the fuel injection quantity based on the accumulated correction quantity and the learned A/F value results in a too lean A/F. When the failure determination unit 22 determines that there is a failure in the fuel injection control system, a corresponding failure code is stored to be of use in future repair. Some failure makes it impossible to continue the normal fuel injection control process. In such case, a switch to an alternative control process provided in case of a failure may be made to maintain performance (exhaust emission control performance, traveling performance, for example) as far as possible.

A specific example of failure determination by the failure determination unit 22 will be described.

The failure determination unit 22 includes a failure determination section 22a which determines that there is a failure in the engine 1 when a predetermined condition is met, and a failure code storing section 22b. Specifically, during A/F feedback, if the accumulated difference obtained by summing differences between an actual A/F detected by the LAFS 13 and a target A/F and the A/F learned value for correcting a stationary deviation of actual A/F from the target deviate from their respective normal ranges in the same direction (to the "rich" or "lean" side), the failure determination section 22a determines that there is a failure, and a corresponding failure code is stored in the failure code storing section 22c.

In addition, the failure determination unit 22 includes a similar operating condition recording section 22c in which an operating condition of the engine 1 at the time that the failure determination section 22a determined that there was a failure is recorded. The factors defining the operating condition of the engine 1 recorded in the similar operating condition recording section 22c will be described later.

The failure determination unit 22 further includes a return-to-normal control section 22d. After the failure code was stored in the failure code storing section 22b, if the failure determination section 22c determines that there is a failure during operation of the engine 1, the return-to-normal control section 22d confirms the decision that there is a failure, and sends out the corresponding failure code. If, after the failure code was stored in the failure code storing section 22b, the failure determination section 22c does not determine that there is a failure when the engine is operating in an operating condition similar to that recorded in the similar engine operating condition recording section 22c, the return-to-normal control section 22d performs a process (later-described return-to-normal process) including elimination of the failure code stored in the failure code storing section 22b. In the present embodiment, the failure code is stored and eliminated on a drive-cycle basis, where the drive cycle means a cycle starting with the start of the engine 1 and ends with the stop of the engine 1. The failure code stored in the failure code storing section 22b in a drive cycle is eliminated by the return-to-normal control section 22d when a predetermined condition is met in a drive cycle after that.

The accumulated difference and the A/F learned value, used in A/F feedback based on output of the LAFS 13, vary depending on the A/F feedback mode, which leads to the problem mentioned in the Description of the Related Art: A failure code stored in the failure storing section 22b based on a decision that there is a failure, made by the failure determination section 22a in some A/F feedback mode, is inappropriately eliminated by the return-to-normal control section 22d in a subsequent drive cycle in another A/F feedback mode.

In view of this problem, the inventor has decided to add an A/F feedback mode determined by a target A/F set by the A/F target setting section 21a, as one of the factors defining an engine operating condition recorded in the similar operating condition recording section 22c. In other words, the inventor has found out that the problem can be solved by, even when the failure determination section 22a does not determine that there is a failure in a drive cycle after a failure code was stored in the failure code storing section 22b based on the decision made in a previous drive cycle, inhibiting the return-to-normal control section 22d from making a return-to-normal process including elimination of the failure code if the A/F feedback mode recorded in the similar operating condition recording section 22c in the previous drive cycle is different from the A/F feedback mode in which the failure determination section 22 has determined that there is not a failure. Based on this knowledge, a fuel system failure determination process performed by the ECU 11 will be described below.

Figure 2:
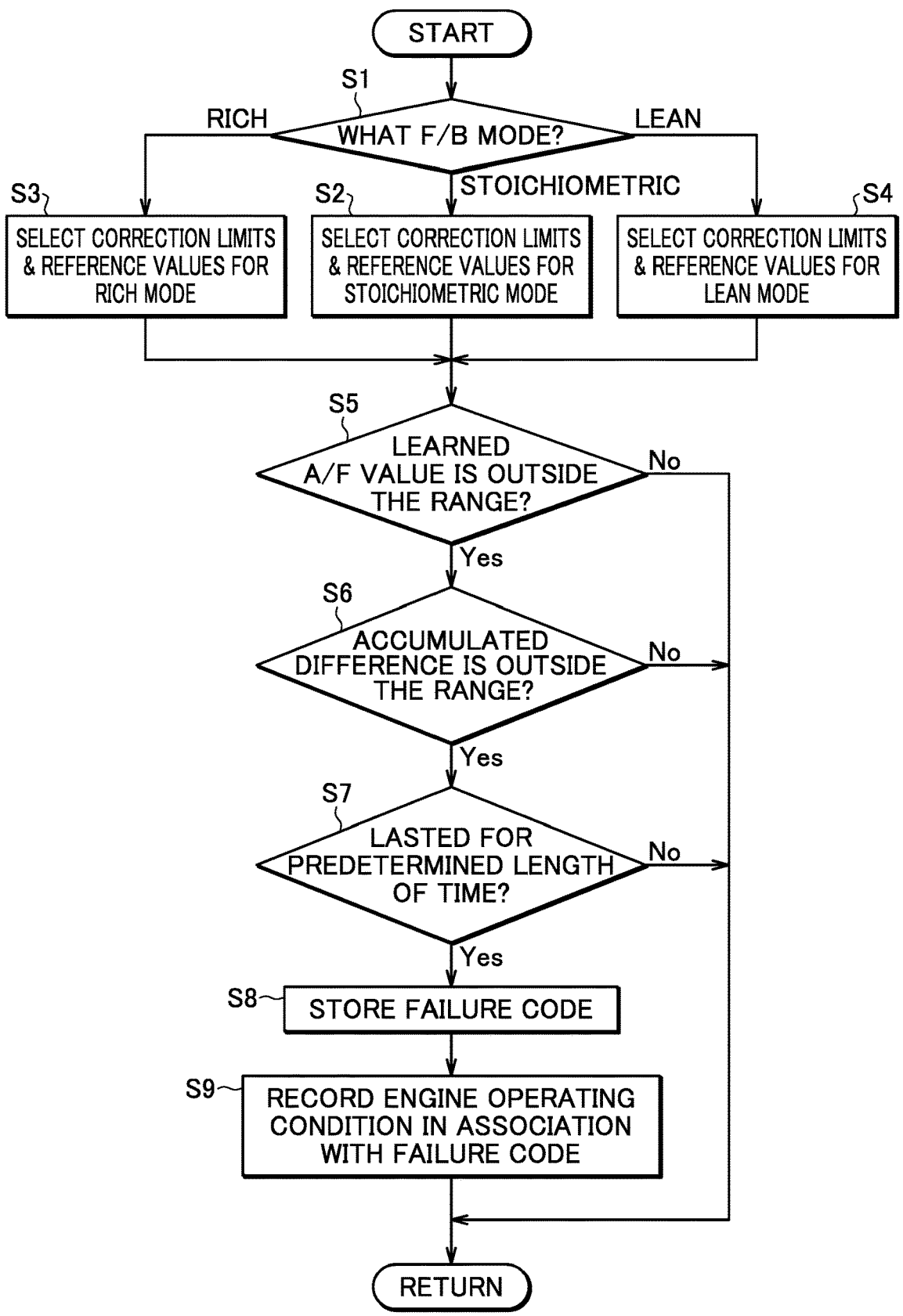
FIG. 2 is a flowchart showing a failure determination routine executed by an ECU 11 shown in FIG. 1.

FIG. 2 is a flowchart showing a failure detection routine executed by the ECU 11. The routine is executed by the ECU 11 during operation of the engine 1 at predetermined control intervals. In the present embodiment, when executing the failure detection routine, the ECU 11 functions as the failure determination unit 22 and the A/F feedback control unit 21.

First at step S1, the failure determination section 22a determines in what A/F feedback mode the A/F feedback control unit 21 is performing A/F control to bring actual A/F to a set target by regulating fuel injection quantity. Next, at steps S2 to S4, failure-determination reference values for accumulated difference and correction limits for A/F learned value corresponding to the identified A/F feedback mode are selected. The failure-determination reference values for accumulated difference and the correction limits for A/F learned value are predetermined for each of the A/F feedback modes. Specifically, if it is determined at step S1 that the current mode is the stoichiometric feedback mode, the failure-determination reference values for accumulated difference and the correction limits for A/F learned value predetermined for the stoichiometric feedback mode are selected at step S2, if it is determined at step S1 that the current mode is the rich feedback mode, the failure-determination reference values and the correction limits predetermined for the rich feedback mode are selected at step S3, and if it is determined at step S1 that the current mode is the lean feedback mode, the failure-determination reference values and the correction limits predetermined for the lean feedback mode are selected at step S4.

The accumulated difference is a value obtained by summing differences between an actual A/F detected by the LAFS 13 and a target A/F set by the A/F target setting unit. The failure-determination reference values for the accumulated difference are set on the "rich" side and the "lean" side of a mid-point "0". The range between them is a normal range for the accumulated difference (first reference range).

The learned A/F value is a value obtained by summing correction quantities applied to the LAFS 13, where the correction quantity means how much the mid-value of the output of the LAFS 13 (i.e., output which should indicate the stoichiometric A/F in the stoichiometric feedback mode) is corrected as compared with its initial value. When the accumulated correction quantity reaches a predetermined upper or lower limit, it is determined that the learned A/F value reaches the correction limit. The correction limits for the learned A/F value are set on the "rich" side and the "lean" side of a mid-point "0". The range between the "rich"-side correction limit and the "lean"-side correction limit is a normal range for the learned A/F value (second reference range).

As described below, whether there is a failure in the engine 1 is determined by determining whether the accumulated difference and the learned A/F value deviate from their respective normal ranges. In the present embodiment, the normal ranges are set differently for the stoichiometric feedback mode, the rich feedback mode and the lean feedback mode. Specifically, the normal ranges for the accumulated difference and the learned A/F value in the rich feedback mode and the lean feedback mode are expanded as compared with those in the stoichiometric feedback mode, in consideration of the output characteristic of the LAFS 13.

Specifically, the LAFS 13 has a characteristic that detection error is small near the stoichiometric ratio and greater farther away from the stoichiometric ratio on the "rich" or "lean" side. In the rich feedback mode and the lean feedback mode, the target is set away from the stoichiometric ratio on the "rich" or "lean" side, and thus, the A/F detected by the LAFS 13 is away from the stoichiometric ratio and likely to contain detection error, accordingly. A/Fs containing detection error are likely to lead to great accumulated difference and great learned A/F value. Thus, the accumulated difference and the learned A/F value in the rich feedback mode and the lean feedback mode tend to be great as compared with those in the stoichiometric feedback mode. If the normal ranges in the rich feedback mode and the lean feedback mode are the same as those in the stoichiometric feedback mode, the accumulated difference and the learned A/F value are likely to deviate from the normal ranges, and thus, a decision that there is a failure is likely to be made. By expanding the normal ranges in the rich feedback mode and the lean feedback mode as compared with those in the stoichiometric feedback mode, difference in likelihood of determining that there is a failure can be eliminated. This ensures that an appropriate decision as to whether there is a failure is made in any of the A/F feedback modes without variations in tendency, and thus, prevents a wrong decision in the non-stoichiometric feedback modes (rich feedback mode and lean feedback mode) as well as in the stoichiometric feedback mode, thereby improving detection accuracy in the whole system.

Further, considering that correction to the A/F based on the accumulated difference and the learned A/F value tends to take place after a switch between A/F feedback modes, the pertinent normal ranges are expanded to prevent a decision that there is a "lean" failure from being made inadvertently. For example, if correction for making A/F richer is likely to take place during a certain period after a switch from the stoichiometric feedback mode to the rich feedback mode, the pertinent normal ranges are expanded on the "rich" side to prevent a decision that there is a "rich" failure from being made inadvertently.

The way of setting the normal ranges in the A/F feedback modes is, however, not limited to the above. For example, the same normal ranges may be set in all the A/F feedback modes, or the normal ranges may be set to have the same upper or lower limit in all the A/F feedback modes.

Referring back to FIG. 2, after the failure-determination reference values for accumulated difference and the correction limits for A/F learned value are selected at steps S2 to S4, control is transferred to step S5. At step 5, the failure determination section 22a determines whether or not the learned A/F value currently applied to fuel injection is beyond the selected "rich"- or "lean"-side correction limit (deviates from the normal range to the "rich" or "lean" side). Then at step S6, the failure determination section 22a determines whether or not the current accumulated difference is beyond the selected "rich"- or "lean"-side failure-determination reference value on the same side as the learned A/F value is beyond the correction limit (deviates from the normal range to the "rich" or "lean" side).

Steps S5 and S6 are intended to determine whether there is a failure based on variations in the accumulated difference and the learned A/F value. Specifically, the phenomenon that, although the learned A/F value has exceeded the "rich"- or "lean"-side correction limit, A/F cannot be maintained at the target, as a result of which the accumulated difference exceeds the "rich"- or "lean"-side failure-determination reference value by continuing increasing on the "rich" or "lean" side cannot normally happen, and thus, can be regarded as indicating a failure.

For this reason, whether the learned A/F value and the accumulated difference deviate from their respective normal ranges in the same direction is determined at steps S5 and S6. For example, if it is determined that the learned A/F value is beyond the "rich"-side correction limit at step S5, whether the accumulated difference is beyond the "rich"-side failure-determination reference value is determined at step S6.

If the result of determination at step S5 or the result of determination at step S6 is No (negative), control returns. If both are Yes (affirmative), control goes to step S7, where the failure determination section 22a determines whether the same situation has lasted for a predetermined length of time (5 sec, for example). If the result of determination at step S7 is No, control exits the routine and returns. If the result of determination at step S7 is Yes, control goes to step S8.

At step S8, a failure code is stored in the failure code storing section 22b. A failure code indicating a "lean" or "rich" failure caused by malfunction of some component of the whole operating system is stored. Specifically, if it is determined that there is a failure when fuel injection quantity is corrected to make A/F richer based on the accumulated difference and the learned A/F value, a failure code indicating a "lean" failure is stored, and if it is determined that there is a failure when fuel injection quantity is corrected to make A/F leaner, a failure code indicating a "rich" failure is stored.

Next at step S9, the similar operating condition recording section 22c identifies, as factors defining the operating condition of the engine 1, an engine rpm Ne, a charging efficiency Ec (engine load), an engine warming state, and an A/F feedback mode at the time the failure code was stored in the failure code storing section 22b. Here, the A/F feedback mode is determined by the target A/F set by the A/F target setting section 21a. These factors are recorded as an engine operating condition in the similar operating condition recording section 22c in association with the failure code. As described later, the engine operating condition recorded is referred to when determining whether to make a return to normal in a subsequent drive cycle.

The factors defining the engine operating condition recorded in the similar operating condition recording section 22c includes the A/F feedback mode at the time the failure determination section 22a determined that there was a failure. Thus, when making repair later, it is possible to not only recognize the type of a failure from the failure code but also recognize in what A/F feedback mode a failure happened, from the recorded engine operating condition. Repair can be made efficiently using the information stored. If a switch from the normal control process to an alternative control process is made, the recorded engine operating condition may help perform the alternative control process appropriately.

FIG. 3 shows a return-to-normal determination routine executed by the return-to-normal control section 22d. This routine is executed by the ECU 11 during operation of the engine 1 at predetermined intervals.

First at step S11, whether a failure code is stored in the failure code storing section 22b based on a decision made by the failure determination section 22a executing the routine of FIG. 2 in a previous drive cycle (in the last drive cycle or a drive cycle before that) is determined. If the result of determination is No, control goes to RETURN. If the result of determination at step S11 is Yes, control goes to step S12. As at steps S1 to S4 in FIG. 2, the failure determination section 22a identifies the current A/F feedback mode at step S12, and if it is the stoichiometric feedback mode, selects the failure determination reference values and the correction limits for the stoichiometric feedback mode at step S13, if it is the rich feedback mode, selects the failure-determination reference values and the correction limits for the rich feedback mode at step S14, and if it is the lean feedback mode, selects the failure-determination reference values and the correction limits for the lean feedback mode at step S15.

Next at step S16, the failure determination section 22a determines whether the current learned A/F value is between the "rich"-side and the "lean"-side correction limits (within the normal range), and then at step S17, determines whether the current accumulated difference is between the "rich"-side and the "lean"-side failure-determination reference values (within the normal range). If the result of determination at step S16 and the result of determination at step S17 are both No, the decision that there is a failure, previously made through steps S5 and S6 in FIG. 2, cannot be denied. Thus, control goes to step S18, where a return to normal is inhibited.

The return to normal is a process including elimination of a failure code stored in the failure code storing section 22b in a previous drive cycle, elimination of an engine operating condition recorded in the similar operating condition recording section 22b in association with the failure code, and if a switch from the normal fuel injection control process to the alternative control process was made, a switch from the alternative control process back to the normal fuel injection control process. Here, since the decision that there is a failure cannot be denied, it can be considered that the engine 1 is still malfunctioning. Accordingly, the failure code and the engine operating condition recorded in the failure code storing section 22b and the similar operating condition recording section 22c based on the decision previously made by executing the routine of FIG. 2 are maintained, and the alternative control process is continued.

If either the result of determination at step S16 or the result of determination at step S17 is Yes, it means that the learned A/F value or the accumulated difference does not meet the condition for determining that there is failure, although in the previous drive cycle, they met the respective conditions at steps S5 and S6, and thus, it was determined that there was a failure. It can therefore be considered that the decision that there is a failure can be denied.

In this case, control goes to step S19, where whether the current engine operating condition is similar to that recorded in the operating condition recording section 22c is determined. More specifically, with respect to the engine rpm Ne and the charging efficiency Ec, it is required that the current value be within a predetermined range including, as a mid-point, the value recorded when the failure code was stored, and with respect to the engine warming state and the A/F feedback mode, it is required that the current one be in agreement with that recorded when the failure code was stored.

If the result of determination at step S19 is No, which means that the engine operating condition is not similar, control goes to step S18. This means that although it is determined at steps S16 and S17 that the accumulated difference and the A/F learned value meet their respective conditions for determining that there is not a failure, the return to normal is inhibited because the engine operating condition is different and thus it cannot be said that the decision has been made in the same situation.

If the result of determination at step S19 is Yes, which means that the engine operating condition is similar, control goes to step S20. At step S20, whether a decision that there is a failure producing a deviation in the same direction as the failure code stored indicates has not been made in the current drive cycle is determined. More specifically, when the failure code stored indicates a "lean" failure, the return to normal is made on the condition that the decision that there is a "lean" failure has not been made in the current drive cycle again, through steps S5 to S7 in FIG. 2, and when the failure code stored indicates a "rich" failure, the return to normal is made on the condition that the decision that there is a "rich" failure has not been made in the current drive cycle again, through steps S5 to S7 in FIG. 2.

When it is determined at steps S16 and S17 that the accumulated difference and the learned A/F value are in their respective normal ranges and then it is determined at step S19 that the engine operating condition is similar, the decision that there is a failure, made in a previous drive cycle, can be denied. However, if it has been determined in the current drive cycle again that there is a failure producing a deviation in the same direction, it can be inferred that the engine 1 is currently malfunctioning, not only in the case where the decision has been made in the same A/F feedback mode but also in the case where the decision has been made in a different A/F feedback mode, and thus, it is determined that the return to normal should not be made. In this case, the result of determination at step S20 is No, and control goes to step S18.

If the result of determination at step S20 is Yes, which means that a decision that there is a failure producing a deviation in the same direction as the failure code stored indicates has not been made in the current drive cycle, the return to normal is permitted at step S21, and then, control exits the routine. Consequently, the return-to-normal control section 22d eliminates the failure code stored in the failure code storing section 22b and the engine operating condition recorded in the similar operating condition recording section 22c at the end of the current drive cycle, and makes a switch from the alternative control process back to the normal fuel injection control process at the time that the next drive cycle starts with start of the engine 1.

As described above, in the present embodiment of the fuel system control apparatus for the engine 1, an A/F feedback mode which is based on a target A/F set by the A/F target setting section 21a is recorded in the similar operating condition recording section 22c as one of factors defining an engine operating condition, is set and in a drive cycle after the failure determination section 22a determined that there was a failure, the return-to-normal control section 22d determines that the engine operating condition is similar on the condition that the A/F feedback mode is the same.

Apart from the A/F feedback mode, engine rpm Ne. charging efficiency Ec and engine warming state are recorded as factors defining the engine operating condition. However, the engine operating condition cannot always be identified only by these factors other than the A/F feedback mode. For example, in a vehicle equipped with an NOx storage catalytic converter, a process for making A/F leaner at a low fuel consumption rate and a process for making A/F richer for purging NOx stored during a lean operation are performed in similar operating regions (medium-load or low-load operating region, for example). Only with the factors other than the A/F feedback mode, it may not be possible to distinguish these operating regions from other operating regions in which rich feedback or lean feedback is performed. It is also difficult to distinguish a process for making A/F richer in high load operation, at high water temperature or in knock retard, from making A/F richer in an A/F feedback mode.

By adding the A/F feedback mode as a factor defining the engine operating condition, the engine operating condition is clearly identified, and when the A/F feedback mode is not the same, it is determined that the engine operating condition is not similar and the return to normal is inhibited. This prevents the failure code stored based on a correct decision that there is a failure from being eliminated inappropriately.

In the above, an embodiment of the present invention has been described. The present invention is however not limited to the described embodiment. For example, although in the described embodiment, the present invention is applied to detection of a failure in the fuel system, it may be applied to detection of a failure in another system. For example, it may be applied to misfire monitoring to detect a failure in the ignition system of the engine 1. Specifically, it is possible to determine whether there is a misfire based on variations in exhaust A/F detected by the LAFS 13, variations in engine rpm detected by the crank angle sensor 12, an ion current produced by combustion in cylinders detected by an ion current system or the like, and then determine whether there is a failure in the ignition system based on the result of determination about the misfire.

The fuel system in the described embodiment includes an $O_2$ sensor 14 downstream of the three-way catalytic converter 7. Thus, depending on how A/F sub-feedback is going based on output of the $O_2$ sensor 14, a failure in the fuel system may be detected in the same manner as in the described embodiment.

Although in the described embodiment, the invention is applied to an engine 1 performing port injection, it is not limited to this type of engine but applicable to any type of engine configured such that A/F control can be performed switching between A/F feedback modes. For example, it may be applied to an engine configured to switch between two injection modes, i.e., port injection mode and in-cylinder injection mode.

What is claimed is:

1. Control apparatus for an engine, comprising:
a controller and a storage that stores a program that causes the controller to,
set a target for an A/F (air-fuel ratio) in the engine,
perform a feedback control on the engine to bring actual A/F in the engine to the set target,
determine that there is a failure in the engine when a predetermined condition is met during an operation of the engine,
store a corresponding failure code when the failure determination step determines that there is the failure,
record an operating condition of the engine, including the set target, in association with the stored failure code at the time the failure determination step determines that there is a failure,
record the set target as a factor defining the operating condition of the engine, and
eliminate the failure code if, after the failure code has been stored, the failure determination step determines that there is no failure when a current operating condition of the engine is similar to the recorded operating condition of the engine at the time when the failure code was stored,
wherein the A/F target setting step sets the target for A/F in the engine at a stoichiometric A/F for a stoichiometric A/F feedback mode, and at a non-stoichiometric A/F ratio for a non-stoichiometric A/F feedback mode, and
the target set for the stoichiometric A/F feedback mode and the target set for the non-stoichiometric A/F feedback mode are recorded in the recording step as a factor defining the operating condition of the engine.

2. The control apparatus according to claim 1, wherein a rich A/F feedback mode and a lean A/F feedback mode are provided as non-stoichiometric A/F modes, the A/F target setting step sets the target for A/F on a "rich" side for the rich A/F feedback mode and on a "lean" side for the lean A/F feedback mode, and
the target set for the stoichiometric A/F feedback mode, the target set for the rich feedback mode and the target set for the lean feedback mode are recorded in recording step as a factor defining the operating condition of the engine.

3. The control apparatus according to claim 2, wherein the failure determination step determines whether there is a failure in the engine based on accumulated difference obtained by summing differences between actual A/F and the target set by the A/F target setting step, and learned A/F value updated to curb an increase in the accumulated difference on a "rich" or "lean" side.

4. The control apparatus according to claim 3, wherein the failure determination step determines whether there is a failure in the engine based on whether or not the learned A/F ratio deviates from a second reference range to a "rich" or "lean" side and whether or not the accumulated difference deviates from a first reference range to a "rich" or "lean" side in the same direction as the learned A/F ratio deviates, wherein
the first and the second reference ranges applied in the non-stoichiometric feedback mode are expanded as compared with those applied in the stoichiometric feedback mode, respectively.

5. The control apparatus according to claim 1, wherein the failure determination step determines whether there is a failure in the engine based on accumulated difference obtained by summing differences between actual A/F and the target set by the A/F target setting step, and learned A/F value updated to curb an increase in the accumulated difference on a "rich" or "lean" side.

6. The control apparatus according to claim 5, wherein the failure determination step determines whether there is a failure in the engine based on whether or not the learned A/F ratio deviates from a second reference range to a "rich" or "lean" side and whether or not the accumulated difference deviates from a first reference range on a "rich" or "lean" side in the same direction as the learned A/F ratio deviates, wherein
the first and the second reference ranges applied in the non-stoichiometric feedback mode are expanded as compared with those applied in the stoichiometric feedback mode, respectively.

* * * * *